US007949132B2

(12) United States Patent
Evans et al.

(10) Patent No.: US 7,949,132 B2
(45) Date of Patent: May 24, 2011

(54) MODULAR ARCHITECTURE TO UNIFY THE PLAYBACK OF DVD TECHNOLOGIES

(75) Inventors: Glenn F. Evans, Kirkland, WA (US); Theodore C. Tanner, Jr., Hollywood, SC (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 11/760,262

(22) Filed: Jun. 8, 2007

(65) Prior Publication Data

US 2007/0234431 A1 Oct. 4, 2007

Related U.S. Application Data

(63) Continuation of application No. 10/610,895, filed on Jul. 1, 2003, now abandoned.

(51) Int. Cl.
*H04L 9/16* (2006.01)

(52) U.S. Cl. .......................................................... 380/210

(58) Field of Classification Search ................... 380/210
See application file for complete search history.

(56) References Cited

U.S. PATENT DOCUMENTS

| | | | | |
|---|---|---|---|---|
| 4,593,382 | A | 6/1986 | Fujishima et al. | |
| 5,913,038 | A * | 6/1999 | Griffiths | 709/231 |
| 6,064,739 | A | 5/2000 | Davis | |
| 6,611,534 | B1 | 8/2003 | Sogabe et al. | |
| 6,959,384 | B1 * | 10/2005 | Serret-Avila | 713/176 |
| 7,050,583 | B2 | 5/2006 | Montgomery | |
| 7,296,154 | B2 * | 11/2007 | Evans et al. | 713/169 |
| 2002/0114462 | A1 | 8/2002 | Kudo et al. | |
| 2003/0140241 | A1 | 7/2003 | England et al. | |
| 2004/0083487 | A1 | 4/2004 | Collens et al. | |
| 2006/0034458 | A1 | 2/2006 | Kim et al. | |
| 2006/0075507 | A1 * | 4/2006 | Langer | 726/26 |
| 2006/0133610 | A1 | 6/2006 | Maruo et al. | |

* cited by examiner

*Primary Examiner* — Matthew B Smithers
(74) *Attorney, Agent, or Firm* — Lee & Hayes, PLLC

(57) ABSTRACT

The present disclosure relates to parsing encrypted content and sending the encrypted content to appropriate stacks of components. Encrypted video content is sent to a video stack and encrypted audio content is sent to an audio stack. Components in either stack may or may not be able to decrypt the encrypted content. A common interface is provided to the components to pass encrypted content and encryption content with one another. Components not able to perform decryption pass on the encrypted content to succeeding components in the stack until a component capable of decrypting the encrypted content receives the encrypted content. Control from a hardware lawyer in a stack may be sent back through the stack using a secure link established by the common interfaces used by the components.

51 Claims, 6 Drawing Sheets

672

Local Area Network
680
676
678
682
Wide Area Network
Application Programs
660
630
634
System Memory
638
(ROM)
BIOS
642
640
(RAM)
Operating System
658
660
Application Programs
Other Program Modules 662
Program Data 664
632
Processing Unit
636
Bus
Video Adapter
674
SCSI Interface
654
644
646
648
650
652
670
Keyboard/ Mouse Interface
668
666
Keyboard
Serial Port
656
Network Interface
684
686
Modem
Operating System
Application Programs
Other Modules
Program Data
658
660
662
664

MODULAR ARCHITECTURE TO UNIFY THE PLAYBACK OF DVD TECHNOLOGIES

RELATED APPLICATIONS

This is a continuation of and claims priority to U.S. patent application Ser. No. 10/610,895 filed on Jun. 30, 2003 entitled "Modular Architecture to Unify the Playback of DVD Technologies" by inventors Glenn F. Evans and Theodore C. Tanner Jr.

TECHNICAL FIELD

The systems and methods described herein relate to manipulating encrypted digital content between components and specifically to systems and methods that allow components to control and pass encrypted digital content to other components of audio and video processing stacks.

BACKGROUND

The most common use of DVD technology is to record and play so-called "DVD-Video", which is a particular data format used to represent movies and other audio/video content. However, newer DVD formats such as "DVD-Audio", DVD-VR, rewritable DVD-Video discs, focus on additional functions. The "DVD-Audio" format records audio content at a higher fidelity than the "DVD-Video" format, although both formats can include both audio and video elements.

Multimedia content such as that found on DVDs can be played back or rendered using a variety of hardware. Such hardware is frequently controlled by software, which coordinates the various functions needed to turn digital data into perceptible audio and visual content.

Although dedicated-function devices are often used for rendering DVD and other multimedia content, personal computers are also being used as multimedia presentation devices. In practice, the internal designs of various types of playback devices may be similar, whether they are dedicated-function devices or more multi-function devices such as personal computers.

FIG. 1 shows relevant components that might be used in a playback device such as a personal computer 100. The illustrated components comprise a mixture of hardware and software. The depicted architecture is similar to that used in the Microsoft Windows® family of operating systems, and in particular in the DirectX® technology used within the Windows® systems. The same or similar technology might be used in a variety of devices, including seemingly dedicated-function devices such as typical stereo-system components.

The components include a DVD disc drive 105 that receives a DVD disc 107. The DVD disc 107 includes audio and video content which in some cases is at least partially encrypted. Collectively DVD disc drive 105 and the received DVD disc 107 are considered a source and will be referred to below as a multimedia source, audio/video source, or simply as source 105. Although the example depicts a DVD source, in other embodiments the multimedia content might be received from some other source such as a network source. An Internet website is an example of such a source.

In this architecture, direct interface with DVD disc drive 105 is accomplished by means of a navigation interface and component 108. Navigation interface and component 108 is responsible for reading the appropriate content from the DVD and for passing it on to other components, to be described below, that decode or transcode, and render the content.

An application or application program 110 is responsible for interacting with a user and for translating user commands into instructions for navigation interface and component 108. Application 110 might, for example, be a media player program implemented in software. Microsoft® Corporation's Windows® Media Player is an example of such a media player program. Application 110 can select different video modes, video angles, subtitle languages, menu languages, playback rates and directions, etc. Navigation interface and component 108 uses this information to select the appropriate video and audio streams.

The playback components include a video processing stack 112 and an audio processing stack 114. Video and audio content retrieved by navigation interface and component 108 are passed respectively to video processing stack 112 and audio processing stack 114 for conversion into signals to drive a video presentation device such as a video monitor and a speaker or other audio transducer (not shown). A processing stack in general comprises one or more processing components arranged linearly so that content is received by a topmost processing component, passed downward through successive components, until is it finally received at a bottommost component. In this example, the content is streamed, meaning that it is flowing continuously into the stack and downward through its components. As the content passes through each component, that processes the content before passing it on to the next component.

In this example, video processing stack 112 has three components: a video decoder 116, a video interface 124, and a video driver/card 126. Audio processing stack 114 has analogous components: an audio decoder 120, an audio interface 130, and an audio driver/card 132. Note that this is merely a simple example of video and audio processing components that may form video and audio processing stacks. In practice, a number of processing components might be included, either in addition to those shown or in some cases in place of those shown. Note also that any individual component might be embodied as hardware or software, although hardware components typically operate in conjunction with a software component that acts as a proxy for the hardware and that provides communications between the hardware and other components. This allows for content to be processed within the context of an Internet based distributed operating system.

A key is code or a phrase that allows locking or unlocking of operational aspects of the protection algorithm. Public key cryptography systems may be known as asymmetric-key systems. An advantage of public key cryptography systems is that public keys are widely distributable and can be important for such actions as authentication of digital signatures. The disadvantage is that public key distribution is slow, because everyone must have access to a key generation mechanism in order for the key to be fully accessible to the public at large.

Public key cryptography has low infrastructural overhead because it has no centralized infrastructure for trusted-key management. Instead, users validate each others' public keys rigorously and manage their own private keys securely. This is difficult to do well, and causes the system to be only as secure as its users. Such a rule of operation is considered to be a compliance defect in a cryptosystem, because the rule is both difficult to follow and unenforceable.

The defects of public-key cryptography make it more suitable for server-to-server security than for desktop applications. Public-key cryptography is uniquely well-suited to certain parts of a secure global network. It is widely accepted that public key security systems are easier to administer, more secure, less trustful, and have better geographical reach than private or symmetric-key security systems. However, even in server environments, public-key cryptography relies too heavily on the security discipline of end users. Some public key systems are RSA, Diffie-Hellman, and ElGamal Private key cryptography systems are also known as symmetric-key systems. The advantages of private key systems are that they are fast and secure. The disadvantage is that the private key must be distributed in advance and must not be divulged, so the system is based on a “kept secret” and is compromised if the key is disclosed. Systems that use private keys have more stringent security requirements to protect private keys against detection, tampering, or outright theft. For example, suppose a financial institution issues a private key to a customer to access his banking records. If the private key is broken once for one transaction, all banking records for that customer are compromised.

Some types of private key systems include DES, RC4, RC5, IDEA, and SkipJack. The Data Encryption Standard (DES) is widely published and used federal standard for private-key systems. The basic DES is a 56-bit key that can be cracked in about a day with specialized hardware. The algorithm called “triple DES” is a 112-bit key that currently cannot be cracked by known techniques.

In the examples described herein, the various depicted system components operate independently as objects, passing content to and from each other with software interfaces as are commonly used in the Windows® programming environment and other object-oriented programming environments. The various arrows shown in FIG. 1 represent content flow through such interfaces. As shown, navigation interface and component 108 interacts with DVD disc drive 105 to retrieve content from a DVD disc 107. Application 110 interacts with navigation interface and component 108 to select various playback parameters. Navigation component 108 provides video and audio content streams to video stack 112 and audio stack 114, respectively.

The first component in each of the stacks is a decoder: video decoder 116 in video stack 112 and audio decoder 120 in audio stack 114. The decoders are used to decompress and decrypt DVD content. DVD-Video typically uses a content protection scheme known as the content-scrambling system (CSS). CSS and other content protection schemes make use of encryption and cryptographic key exchange between encrypted DVD disc sectors and decrypting components. DVD-Audio uses a scheme known as content protection for prerecorded media (CPPM). In these schemes, the navigation interface and component 108 acts as an intermediary to transfer encryption keys and content between the DVD source and the appropriate decoder. When needed, a decoder (e.g., video decoder 116 and audio decoder 12) uses the decryption key to decrypt the content before decompression. Separate, secure logical communications channels are used for the video and audio streams.

After decoding and decryption, the video and content streams are passed to subsequent processing components of the respective processing stacks. In the case of video, it is passed in this example to video interface 124 and then to video driver/card 126. Audio is passed to audio interface 130 and audio driver/card 132.

Content protection schemes such as CSS, CPPM, and content protection for recorded media (CPRM) make use of a three step process: establishing an encrypted secure logical side-band bus (i.e. through a separate channel from the actual video/audio content flow channel), an authentication process over the bus that involves a key exchange between the source such as the DVD disc drive 105 and a decrypting component. The logical bus is established by negotiating a common session key over possibly publicly-visible communication channels. A third process, referred to as decrypting, involves another key transfer over the secure logical bus to be used to decrypt the encrypted video or audio content. Collectively, establishing the logical bus, the authentication and passing of the decryption key are referred to as “key exchange”. Navigation interface and component 108 receives and sends keys from the DVD source for the video stack 112 through secure logical busses 133 and 135 and audio stack 114 through secure logical busses 140 and 145. Decryption keys for video stack 112 are sent from DVD disc drive 105 to the video decoder 116 through the navigation interface and component 108 through secure logical bus 133 and 135. A key exchange is performed with the audio decoder 120 through secure logical bus 140 and 145.

Although not shown, DVD video may include “primary” video content and “sub-picture” video content. Primary video content may include things like movie scenes, while sub-picture video content is overlaid on top of the primary video and may include menus/menu-highlights and subtitles or graphics that can be optionally overlaid on the movie scenes. An additional decoder is typically provided in the video stack for sub-picture video content, and a video mixing renderer component may also be included in the video stack to perform the appropriate overlaying in response to control by application program 110.

The architecture shown in FIG. 1 and described above endeavors to provide copy protection for DVD content. However, it presents at least one weakness in this regard. In particular, audio and possibly video content is passed from the decoder to numerous subsequent processing components in the stack in an unencrypted state. This makes it possible for a hacker to tap into the content flow between components, and thereby obtaining a decrypted version of the audio content.

Typically for video, a video decoder such as 116 may add some form of private encryption to video hardware. Unfortunately, a custom encryption technique is used with each video card manufacturer. Each video card manufacturer must also support multiple decoder vendors' custom encryption techniques. Not only is this a costly infrastructure to support (e.g. vendors must coordinate and test), but it prevents new vendors from working with other vendor's components.

In the case of DVD-Audio formatted content, it is assumed that the audio is of even higher value since it is of higher fidelity then audio on a DVD-video disc. Thus, protecting it from unauthorized copying of its uncompressed form is of paramount importance.

The DVD-audio encryption mechanism is also used for DVD-video content on rewritable or write-once media. Since each piece of writable media has a unique identifier, the identifier can be used to generate an encryption key to “tie” written content to the media.

To overcome the vulnerability of DVD-Audio-formatted content to unauthorized copying, manufacturers have relied on so-called monolithic drivers rather than the stack architecture described above. All processing, including decryption, is performed within a single component, making it difficult for a hacker to tap into a decrypted content flow. For writable DVD-video similar monolithic stacks have been used.

However, this solution for DVD-audio has several drawbacks. Although a monolithic stack provides audio playback, it does not allow video playback support. In other words, commands cannot be sent back up the monolithic stack to control video playback. For example, there is a provision for DVD-audio content to control a wipe (e.g., dissolve or fade command) for a video content. With a specialized audio player (i.e., monolithic stack), a navigator (e.g. navigation interface and component 108) does not issue feedback to control video wipes.

Since the DVD-audio monolithic stack exclusively controls playing of audio content, other PC applications such as a media player program cannot control or make use of the audio content.

Because the monolithic stack depends on proprietary protocols unique to the monolithic stack, components in the monolithic stack cannot be easily exchanged or replaced. In other words, the choice of components in the monolithic stack is limited or not allowed. This limits the options available to a PC manufacturer as to components, whether in software and/or hardware, in an audio stack. Typically, the only option to a PC manufacturer may be the monolithic stack or audio player.

Similar componentization deficiencies exist with DVD-video approaches for writable media.

SUMMARY

The system and methods described herein include a stack of components that receive encrypted content, read unencrypted content describing the encrypted content and pass the encrypted content along the stack to a component capable of decrypting the encrypted content.

In certain embodiments interfaces are provided to the components that allow them to pass encrypted content to one another and communicate with other components and applications that are not in the stack of components.

Particular embodiments provide for secure logical busses through the stack of components that allow commands to be passed.

DETAILED DESCRIPTION

Stack Architecture

Figure 1:
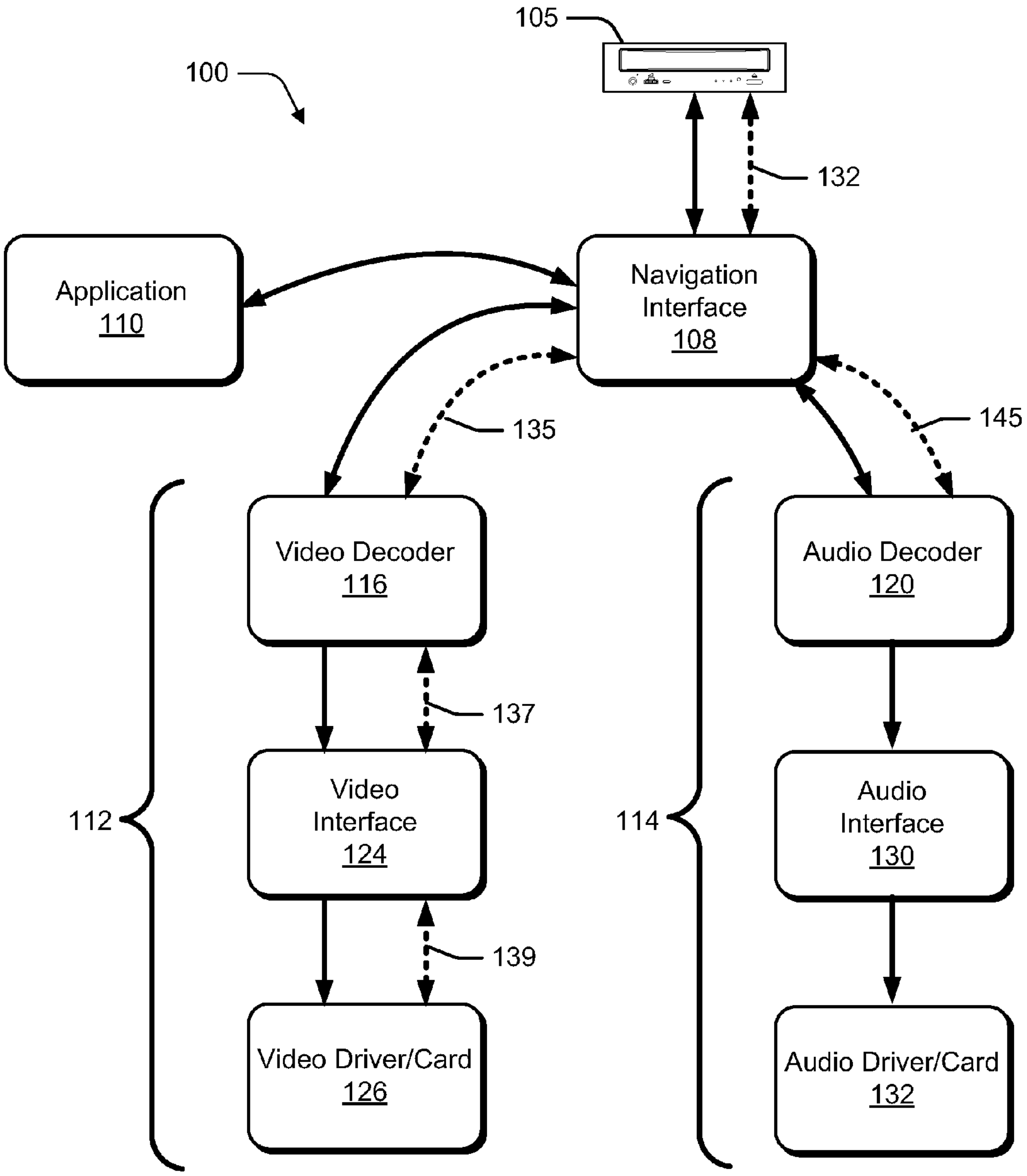
Fig. 1 (Prior Art)
FIG. 1 is a block diagram illustrating a prior art playback device such as a personal computer for video and audio content.
Figure 2:
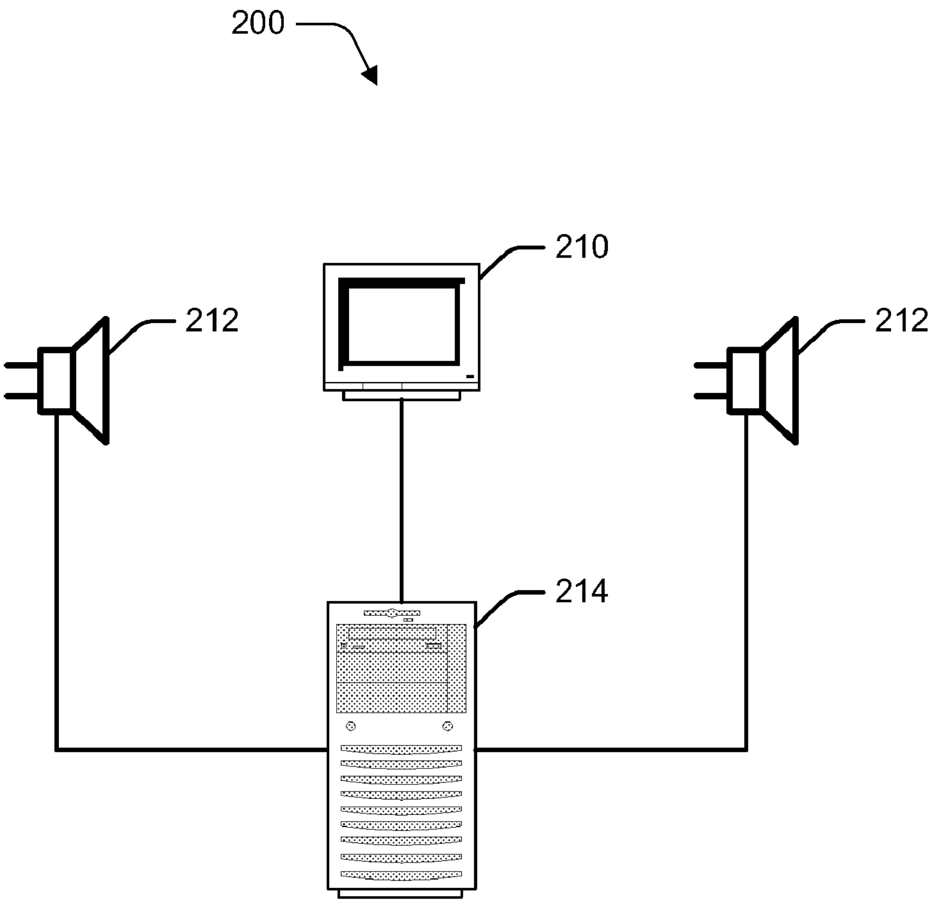
FIG. 2 is a block diagram illustrating a DVD playback system and particular high level components.

FIG. 2 shows high-level components of a DVD playback system 200. The system includes a multimedia source 205, which in this example is a DVD drive and recorded DVD recorded medium that is received by the DVD drive. The DVD medium has recorded content that is formatted in accordance with the DVD-audio standard or DVD-video on rewritable or write-once media, as defined by the Optical Storage Technology Association (OSTA). The recorded content includes encrypted DVD-video and/or DVD-audio content. Collectively DVD disc drive 105 and the DVD disc are considered a source and will be referred to below as a DVD source or simply as source 205. In other embodiments, the multimedia source might comprise something other than a DVD drive, such as an Internet website providing encrypted content.

The DVD disc contains encrypted content and decryption keys that are passed down to components that are able to perform decryption. Specifically, the DVD disc includes data sectors, each of which comprises an unencrypted header and corresponding encrypted content. The unencrypted headers contain information about the sectors, allowing processing components to perform certain processing and handling operations on the sectors without the need for decrypting the content. For example, a certain component may determine from the unencrypted header information that the sector can be simply ignored and passed on to a subsequent processing component. The header also includes what kind of content the sector contain (e.g. video, audio, sub-picture etc) so that it may be sent to the appropriate decoder.

System 200 also includes one or more presentation devices, which in this case comprise a visual display monitor 210 and one or more speakers 212.

System 200 further comprises a multimedia decoding and rendering device 214. Rendering device 214 can be a dedicated function device such as a DVD player, or might be a more general-purpose device such as a personal computer or other type of multi-function computer device. In the described example, the rendering device is a personal computer running one of Microsoft Corporation's Windows® family of operating systems. Such operating systems typically include resources for video and audio handling, including DirectX® multimedia technology. Elements of this multimedia technology are used in the exemplary embodiment shown and described herein, and certain of the elements described below are intended to extend the existing functionality of and be utilized within the DirectX® multimedia product. Exemplary details of a suitable computer operating environment are described at the end of this description, with reference to FIG. 6.

Figure 3:
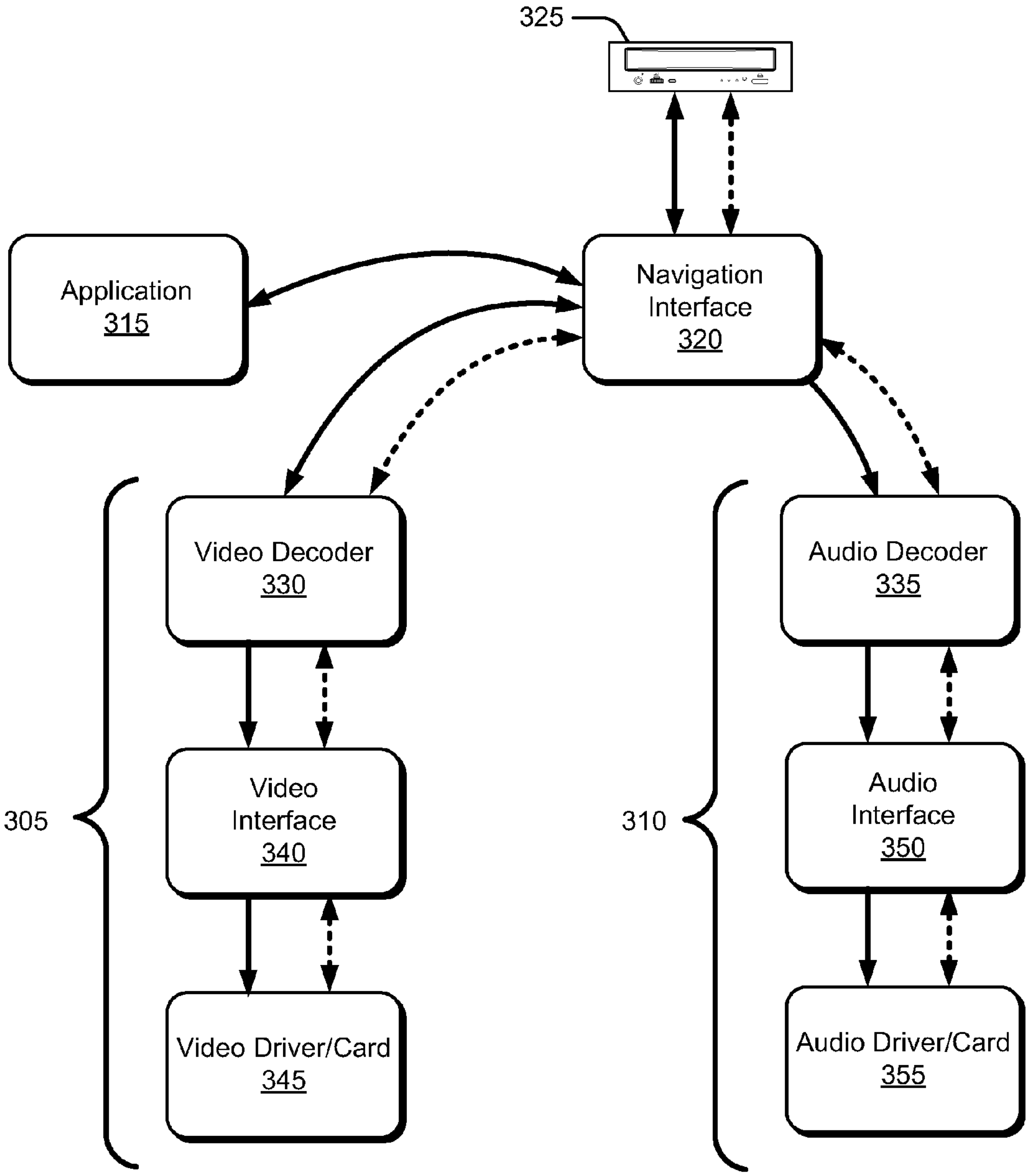
FIG. 3 is a block diagram illustrating relevant multimedia playback components of decoding and rendering device such as a personal computer.

FIG. 3 shows relevant multimedia playback components of decoding and rendering device 214. Processing the data sectors that are read from a DVD disc is generally performed by a video stack 305 and an audio stack 310. Each stack comprises a sequence or chain of processing and/or rendering components. Content is received by the first or top component of the stack, optionally processed, and passed down to the subsequent or next lower component of the stack. In the case of encrypted audio or video content, in some cases the content will be decrypted at one of the components in order to allow the appropriate processing. In other cases, processing or handling might be accomplished without decryption, based on header information for example. Each stack component can be implemented in software, hardware or a combination of both software and hardware. If an intermediate component decrypts, to prevent the decrypted content from being copied (i.e., "tapped" from the decrypting component) at the lower layer components, custom/private encryption algorithms may be used to re-encrypt the content after decryption and before passing to a lower layer processing component.

If a component does not need to decrypt the original DVD-video or DVD-audio content, then the component can pass on (or "proxy") the key exchange and decryption task to the next component in the stack. This reduces the number of custom (or private) encryption/decryption operations between third party components. For example if the hardware directly understands how to perform a key exchange and perform decryption of DVD content, software components have no need to understand (or need certification per CSS or CPPM licensing guidelines) encrypted content. If hardware in one or more stacks does not support the key exchange/encryption, then a software component may be inserted that understands the key exchange/encryption. The software component may set up a secondary encryption channel with a succeeding component in the layer below.

For DVD-audio, the level of protection for video content may not be as high as the audio content. It may be possible to playback DVD-audio with full video playback on a system which has full key exchange/encryption audio hardware support but weaker video encryption support; however, it does not infer that the methodologies as described in this disclosure are no less robust in intent.

Providing common interfaces for the key exchange/encryption, allows a manufacturer or integrator to freely chose components to within the video and audio stacks, in contrast to a stack that incorporates proprietary encryption protocols (e.g., a monolithic stack) that limits the component choices and may require the provision to make use of particular proprietary encryption protocol interfaces used to access components.

In addition to processing stacks 305 and 310, the components of FIG. 3 include an application 315 and a navigation interface and component 320 that together control playback of and interact with a DVD source 325. Application 315 might, for example, be a media player program implemented in software. Navigation interface and component 320 initially receives content from DVD source 325 and parses it to separate video content and audio content. This parsing is based on unencrypted headers of DVD sectors of a DVD disc. Application 315 and navigation interface and component 320 in this embodiment are implemented as software components.

Video stack 305 in this example includes a video decoder 330 at its top layer. The illustrated audio stack 310 includes an audio decoder 335 at its top layer. It is contemplated that video decoder 330 may be implemented in any combination of software and hardware, while audio decoder 335 may typically be implemented in software. Video decoder 330 receives encrypted primary video content, along with related unencrypted headers. Audio decoder 335 receives encrypted audio content, along with related unencrypted headers.

In addition to decoder 330, video stack 305 comprises a video interface 340 and a video driver/card 345, at successively lower layers of the stack. Video content is passed and processed through the video stack from the highest layer, at decoder 330 to the lowest layer, at video driver/card 345. In this simplified example, only three processing layers/components are shown. In practice, however, the video stack 305 might comprise additional and/or alternative processing components. For example, the video stack might include a sub-picture decoder for sub-picture content and a video mixing renderer for combining the primary video content with such sub-picture content.

Video decoder 330 decrypts and optionally decompresses encrypted video content that it receives. The optionally decompressed and optionally decrypted content is then passed on to video interface 340, which will generally be implemented in software. As an example, video interface 340 may be a Microsoft® DirectX® interface for multimedia. Video interface 340 passes the video content to video driver/card 345, which optionally decrypts/decompresses and sends the video content to a display or video output (not shown) of the system 200. Video card 345 will most likely be implemented in hardware.

The audio stack 310 comprises audio decoder 335, an audio interface 350, and an audio driver/card 355. Audio decoder 335 receives and optionally decompresses received audio content. Audio decoder 335 also optionally decrypts the encrypted content. Audio decoder 335 then passes the decompressed (if so decompressed) and decrypted (if so decrypted) audio content to audio driver/card 355. Audio driver/card 355 typically is implemented in hardware. If audio content is encrypted or compressed when received by audio driver/card 355, audio driver/card 355 decrypts the audio content.

Furthermore, the compressed or encrypted content may be sent to a remote audio renderering device (not shown).

Key Transfer and Decryption

In FIG. 3, data communications for the most part take place over the illustrated solid lines. Dashed lines are used in FIG. 3 to indicate secure communications such as communications of decryption keys, authentication data, etc. Decryption key data, in particular, are passed from DVD source 325 to the navigation component 320 and various stack components using logical communications paths that are referred to as secure logical busses. These are software-implemented communications channels that utilize encryption techniques to protect content from eavesdropping by other computer components. The CSS and CPPM protocols, described above, are examples of how such secure communications channels might be implemented.

Figure 4:
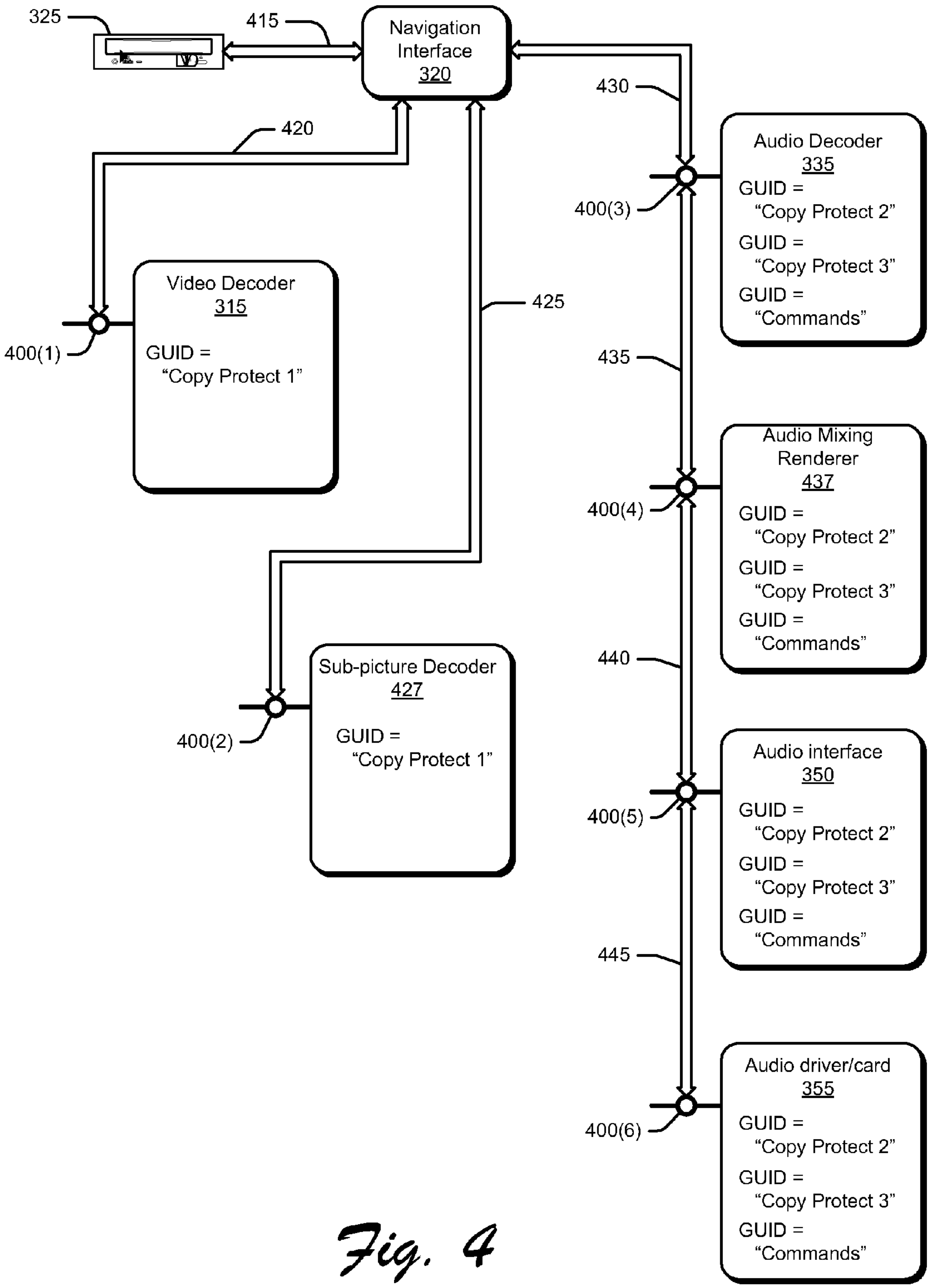
FIG. 4 is a block diagram illustrating logical busses and programmatic interfaces between multimedia playback components in a decoding and rendering device such as a personal computer.

FIG. 4 illustrates secure logical busses and programmatic interfaces between playback components. A secure logical bus 415 is created between DVD source 325 and through navigation interface and component 320 to the video decoder 315. Per CSS defined encryption protocols, authentication is performed with DVD source 425 and video decoder 315 through secure logical busses 415 and 420. Similarly, a secure logical bus 425 is created between the source 325 through navigation interface and component 320 via secure logical bus 415 and a sub-picture decoder 427. Authentication may be performed using CSS defined encryption protocols between DVD source 325 and sub-picture decoder 427 through secure logical busses 415*v* and 425. Sub-picture decoder 427 decompress sub-picture video content which is blended with content from video decoder 315 at a video mixing renderer (not shown) with video. Sub-picture video content may include menus and subtitles that are overlaid on movie scenes.

Further, secure logical bus 415 may be set up as separate logical busses for video and sub-picture content and encryption.

Application 315 of FIG. 3 may send instructions or commands to navigation interface and component 320 to initiate communication with DVD source 325. Navigation interface and component 320 sends (passes) initiation commands to DVD source 325.

As to content protection schemes such as content scrambling system (CSS) used for DVD-video, content protection for prerecorded media (CPPM) used for DVD-audio, and content protection for prerecorded media (CPRM) that may be used for DVD-audio or DVD-video, component or device authentication is initially utilized.

In this example, video decoder 315 performs decryption based on CSS, CPPM, or CPRM. In other cases, decryption may be performed in a succeeding component to the decoders 315 and 427 in the video stack. After an authentication process, media (i.e., title) or decryption keys for particular encrypted sectors may be exchanged between the DVD source 325 and the decoders 315 and 427. The media key and title key are used to decrypt the encrypted content.

It is contemplated that components in the audio or video stack may use CPPM and CPRM content protection schemes, therefore a component that performs decryption may either use CPPM or CPRM encryption protocols. If a component does not implement the decryption, then it forwards the key exchange parameters to the a succeeding component in the stack.

Encryption and decryption keys may be sent from DVD source 325 to the decrypting component in the audio or video stack through secure logical bus 415. Secure logical bus may be further set up as a secure logical bus for audio. Secure logical busses 415 and 430 are created between the DVD source 325 and audio decoder 335; if 335 decrypts, a secure logical bus 435 is created between audio decoder 335 and the next component that processes content. This is usually an audio mixing render (AMR) 437 that renders the decompressed audio; if the AMR 437 decrypts a secure logical bus 440 is created between AMR 437 and the next component in the chain audio interface 130; and a secure logical bus 445 is created between audio interface 350 and audio driver/card 355.

The CPPM authentication process is similar to CSS; however a bus key is generated that is used to extract an "album" key is which is used to decrypt all of the encrypted DVD-audio content. Therefore with just the bus key, protected DVD-content may be decrypted. The CPRM authentication process is similar to the CSS authentication process. CPRM protocols make use of a media key that is used in the content decryption process.

In the audio stack, audio decoder 335, AMR 427, audio interface 350 or audio driver/card 355 may perform decryption. Each device may receive and send decryption and encryption keys. If a component does not perform decryption the key exchange calls and information (i.e., encryption/decryption information) are relayed on to the succeeding component.

Another difference between the CSS process and CPPM/CPRM is that CSS uses a different encryption key for each video track whereas CPPM/CPRM uses the same key for the entire disc.

Cross-Stack Commands

In the described embodiment, commands may be initiated from the navigation interface and component 320 for a video effect such as a "wipe" that affects video content and/or sub-picture content received at a video mixing renderer in a video stack. In particular, the wipe commands add wipe effects to DVD-audio stills. Such wipe commands may be timestamp dependent. Navigation interface and component 320 passes the wipe command through as commands to video decoder 330 and/or sub-picture decoder 427, which passes the wipe commands to the video mixing renderer. Alternatively, navigation interface and component 320 may pass the wipe command as to application 315 of FIG. 3 which sends the wipe commands that instructs the video mixing renderer.

A wipe command may be communicated by means of a property set, utilizing the KSPropertySets interface defined in the DirectX® protocol (described in more detail below) or as a command embedded in the content stream In this example, such a property set comprises the following properties, defined as a data structure:

```
Struct VideoWipe
{
    REFERENCETIME           rtStart
    REFERENCETIME rtEnd
    Enum (DWORD)            dwEffect
}
```

-continued

```
where the enumeration for dwEffect would be
    0 - no effect
    1 - fade to black
    2 - fade from black
    3 - wipe from right
    4 - wipe from left
    5 - wipe from bottom
    6 - wipe from top
    7 - wipe from top left corner
    8 - wipe from top right corner
```

In the above data structure, "rtStart" represents an indexed time value when the wipe command is initiated, and "rtEnd" represents an indexed time value as to when the command stops.

IOCTLs and Property Sets

In the authentication process with DVD source 325, navigation interface and component 320 may communicate with DVD source 325 through input output control codes (IOCTL) where DVD source 325 is configured to make use of such IOCTLs. In particular IOCTLs for key exchange may be used. Examples of IOCTL include the following:

A "DVD read key" IOCTL which returns a copy protection key such as a challenge key, a bus key, a media (i.e., title), or disc key. A challenge key or bus key is sent back to the Navigation interface and component 320 to complete an authentication sequence.

A "DVD read structure" IOCTL which returns information about a DVD disc in DVD source 325, such as a layer descriptor, copyright information, manufacturer-specific information, or key data.

A "DVD send key" IOCTL which sends a specified key to the DVD source 325 in order to complete the authentication sequence.

Components may include properties that are part of a set (i.e., collectively referred to as a "property set"). A common property set is made available to a group of components, where each property defines a particular action or instruction. Properties may be sent and received by components, and components may either change the property or send it along to other components. Property sets may be identified by a general unique identifier (GUID).

Particular property sets may be used to send and receive decryption/encryption keys in a content protection scheme such as CSS, CPPM, and CPRM. Typically components implemented in software directly make use of a property set, while components implemented in hardware may require a "proxy" interface to make use of a property set. For example, if video decoder 315 is implemented in hardware, property set (i.e. properties) information is conveyed to video decoder via a proxy interface.

Programmatic interfaces may be used in receiving and sending properties between components. In this example programmatic interfaces 400(1) to 400(6) are illustrated. Programmatic interfaces 400(1) to 400(6) may make use of the GUID that identifies the property set and a parameter (for example "DWORD") that identifies the property within the property set.

A particular property set for CSS may be used for video decoder 315 and sub-picture decoder 427. Such a property set may be identified by the GUID "Copy Protect 1" as shown in video decoder 315 and sub-picture decoder 427 of FIG. 3. "Copy Protect 1" may include the following properties:

A "Challenge Key" property which supports "GET" and "SET" operations, where a "GET" operation requests a decoder (i.e., video decoder 315 and sub-picture decoder 427)

to provide its bus challenge key. A "SET" operation provides a decoder with the bus challenge key from the DVD source 325.

A "Bus Key" property which is a "GET" only operation, requests that a bus key of the video decoder 315 or sub-picture decoder 427 be transferred to the DVD source 325.

A "Disc Key" property which is a "SET" only operation property that provides a disc key to video decoder 315 or sub-picture decoder 427, or component in the video stack.

A "DVD Region" property that provides video decoder 315 and sub-picture decoder 427 region definition from the DVD source 425 as to what geographical region the decoders 315 and 427 are allowed to play.

A "Copy State" property which provides "GET" and "SET" operations. A "GET" operation is called first to determine if authentication is required. A "SET" operation is an indication as to which phase of copy protection negotiation a component (e.g., video decoder 315 and sub-picture decoder 427) is entering.

A "Media Key" property which provides a "SET" operation that to receive from DVD source 325 media (i.e., title) key information for particular encrypted content to a component in the video stack.

Audio content protection may make use of either CPPM or CPRM. Therefore a property set with a GUID "Copy Protect 2" may be provided for CPPM and a property set with a GUID "Copy Protect 3" may be provided for CPRM. The distinctive property sets are provided for the unique encryption protocols provided by CPPM and CPRM; however, it is contemplated that "Copy Protect 2" and "Copy Protect 3" will have the same (i.e., similar) properties as listed above for "Copy Protect 1".

As shown in FIG. 4 audio decoder 335, AMR 437, audio interface 350, and audio driver/card 355 of the audio stack have property sets identified through GUIDs "Copy Protect 2" and "Copy Protect 3".

Audio Driver/Card Provisions

Audio driver/card 355 may be implemented as a register class audio driver with a direct memory access (DMA) that employs registers and programmed input output. Alternatively audio driver/card 355 may be implemented as a serial class driver such as Intel® Corporation and Microsoft® Corporation defined Azalia audio driver whose control interfaces communicates using words (e.g., 32 bit integer values) as commands and responses between codecs and the host controller. Although a synchronous serial bus implementation is described, an asynchronous bus that may have commands from different sources may also be implemented. Asynchronous busses include "Ethernet" busses that provide for command packets to arrive out of order.

Register Class Audio Driver

To add support to the register class driver, in particular for exchange of encryption and decryption keys, the following logical registers are provided:

| | |
|---|---|
| DWORD | dwKeyType |
| DWORD | Length |
| VOID* | pSrc - non NULL for read (get) operations |
| VOID* | pDest - non NULL for write (set) operations |
| DWORD* | pResult - return result |

The KeyType (dwKeyType) and SrcLength (Length) are one of the following pairs:

| Name | KeyType | Ops | SrcLength |
|---|---|---|---|
| DvdChallengeKey | 1 | R/W | DVD_CHALLENGE_KEY_LENGTH |
| DvdBusKey1 | 2 | W | DVD_BUS_KEY_LENGTH |
| DvdBusKey2 | 3 | R | DVD_BUS_KEY_LENGTH |
| *DvdTitleKey | 4 | n/a | DVD_TITLE_KEY_LENGTH (*=not used for CPPM/CPRM) |
| DvdCopyState | 5 | R/W | DWORD (see below for values) |
| DvdDiscKey | 0x80 | W | DVD_DISK_KEY_LENGTH |
| *DvdMediaKey | 0x81 | W | DVD_MEDIA_KEY_LENGTH (*=not used for CSS) |

Where DvdCopyState is
0 - Write - initialize
*1 - Write - initialize title key (* = not used for CPPM/CPRM)
2 - Read - authentication not required
3 - Read - authentication required
4 - Write - done (key exchange complete)

In particular, the audio driver/card 355 maps properties of "Copy Protect 2" or "Copy Protect 3" into the registers depending on whether CPPM or CPRM is used.

Serial Class Audio Driver

A serial class register may send and receive data (i.e., encryption and decryption keys and commands) in the following form:

| | |
|---|---|
| Verb (32 bits total) | |
| Verb.cmd | 12 bits |
| Verb.data | 20 bits |
| Response (32 bits) | |

For key exchange, the bits are used in the following format:

| | |
|---|---|
| Verb (32 bits total) | |
| Verb.cmd | 12 bits |
| Response (32 bits) | |
| upperByte | 8 bits |
| lowerByte | 8 bits |
| status | 16 bits |

The key type may be mapped into a corresponding verb and placed in the "Verb.cmd" field. Commands may be interleaved with other bus commands, so a block of data is either transferred as a stream of bytes with a position index, or as a block with a start and end code.

Read and write operations for the same key type may be specified as two different verbs. The verb types are:

| Name | Verb.cmd | Ops | Verb count (one WORD per transfer) |
|---|---|---|---|
| DvdChallengeKeyR | 1 | R | DVD__CHALLENGE__KEY__LENGTH / 2 |
| DvdChallengeKeyW | 2 | W | DVD__CHALLENGE__KEY__LENGTH / 2 |
| DvdBusKey2R | 3 | R | DVD__BUS__KEY__LENGTH / 2 |
| DvdBusKey1W | 4 | W | DVD__BUS__KEY__LENGTH / 2 |
| *DvdTitleKeyW | 5 | n/a | DVD__TITLE__KEY__LENGTH / 2 (*=not used for CPPM/CPRM) |
| DvdCopyStateR | 6 | R | 1 |
| DvdCopyStateW | 7 | W | 1 |
| DvdDiscKeyW | 8 | W | DVD__DISK__KEY__LENGTH / 2 |
| *DvdMediaKeyW | 9 | W | DVD__MEDIA__KEY__LENGTH / 2 (*=not used for CSS) |

For serial class audio drivers, encryption/decryption keys and/or commands (blocks of data) may be sent and received using an index and 8 bit data.

The Verb.data field may be used in the following bit allocation scheme:

| | |
|---|---|
| Verb.data.index | 12 bits |
| Verb.data.byte | 8 bits |

A block of data may be transferred as a series of verbs (one BYTE sent per verb) where a Verb.cmd field indicates a 12 bit offset index of the BYTE in the data block. A block ending code with an index equal to the transfer size indicates the completion of the block. A block may be prematurely completed by sending an ending index. The following algorithm may be used to send a data block of a particular "datasize" of bytes for a given verb.cmd type block type:

```
For i=0.. datasize −1
      OutVerb.cmd = verb.cmd
      OutVerb.data.index = i
OutVerb.data.byte = data[i]
      SendVerb( OutVerb )
      Error = OutVerb.response
End
```

A block of data is read in a similar fashion except that the verb becomes a request for a WORD of data. For example, to read a key with "datasize" bytes the following may be used:

```
For i = 0..datasize/2 −1
      InVerb.cmd = verb.cmd
      InVerb.data.index = i
      InVerb.data.byte = 0
      SendVerb( InVerb )
      Data[ i*2 ] = InVerb.response.upperbyte
      Data[ i*2+1 ] = InVerb.response.lowerbyte
      Error = InVerb.response.status
End
// get final byte (real status)
\InVerb.cmd = verb.cmd
InVerb.data = datasize << 8
SendVerb( InVerb )
error = InVerb.response.status
```

If the components in the audio stack support asynchronous transfers to improve performance, then the main data (index 0 to index datasize-1) may be sent asynchronously followed by a synchronous transfer of the completion verb. Audio driver/card 355 may have a provision to serialize the completion of mixed asynchronous and synchronous transfers. Encryption/decryption keys and commands (blocks of data) may be sent and received using start/end codes and 16 bit data.

The 20 bits in the Verb.data field may be used in the following bit allocation scheme:

| | |
|---|---|
| Verb.data.subcmd | 4 bits |
| Verb.data.lowerbyte | 8 bits |
| Verb.data.upperbyte | 8 bits |

Serial class drivers make use of a serialized data stream (i.e, keys and commands are sent and received serially). Since the data stream is serialized, the data transfer may be doubled if data is sent as "words" wrapped with start and end codes. The 4 bits of the Verb.data.subcmd field may be used to indicate the subcommand type where:

0—block_start

1—block_end others—reserved

The following algorithm may be used to send a data block of 'datasize' bytes with for a given verb.cmd type block type:

```
OutVerb.cmd = verb.class
OutVerb.data.subcmd = block__start
SendVerb( OutVerb )
error = OutVerb.response.status
For i=0.. datasize/2 −1
      OutVerb.cmd = verb.cmd
      OutVerb.data.upperbyte = data[i*2];
OutVerb.data.lowerbyte = data[i*2+1]
      SendVerb( OutVerb )
      Error = OutVerb.response.status
End
// send block end
OutVerb.cmd = verb.class
OutVerb.data.subcmd = block__end
SendVerb( OutVerb )
error = OutVerb.response.status
```

A block of data may be read in a similar fashion except that the verb becomes a request for a byte of data. For example, to read a key with "datasize" bytes the following algorithm may be used:

```
InVerb.cmd = verb.class
InVerb.data.subcmd = block__start
SendVerb( InVerb )
```

-continued

```
error = InVerb.response.status
For i=0.. datasize/2 -1
     InVerb.cmd = verb.cmd
     SendVerb( InVerb )
     data[i*2] = InVerb.data.upperbyte
     data[i*2+1] = InVerb.data.lowerbyte
     Error = InVerb.response.status
End
// send block end
InVerb.cmd = verb.class
InVerb.data.subcmd = block_end
SendVerb( InVerb )
error = InVerb.response.status
```

If the components in the audio stack support asynchronous transfers to improve performance, then the main data (index 0 to index datasize-1) may be sent asynchronously followed by a synchronous transfer of the completion verb. Audio driver/card 355 should have the provision to serialize the completion of mixed asynchronous and synchronous transfers.

Operation

Figure 5:
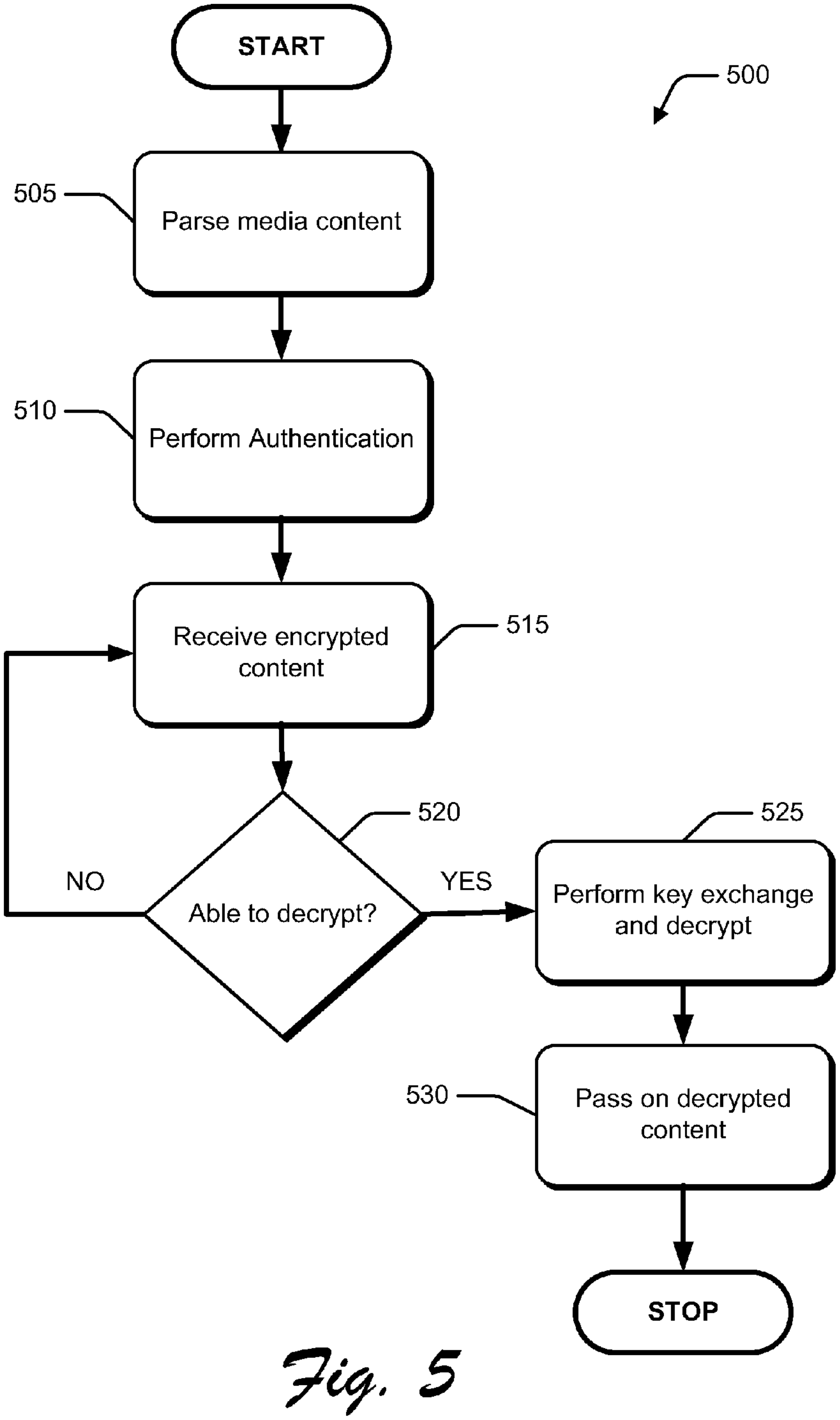
FIG. 5 is a flow chart illustrating a process that controls encrypted content without decrypting content.

FIG. 5 is a process 500 for controlling encrypting content without encrypting the content.

At block 505, media content from a source such as a DVD source 325 of FIGS. 3 and 4 is parsed into video and audio content. The content may be encrypted or unencrypted, and include unencrypted information describing the content. Parsing may be performed by application 315 of FIG. 3 through navigation interface and component 320 of FIG. 3.

At block 510, a component may receive encrypted content, and reads unencrypted content describing the particular received content.

At block 515, a determination is made if a component is able to decrypt the encrypted content. If the component is not able to decrypt the encrypted content (following the "NO" branch of block 515), the encrypted content is passed on to a succeeding component in the stack.

If the component is able to decrypt the encrypted content (following the "YES" branch of block 515), block 520 is performed.

At block 520, securing a bus and authentication may be performed for a component or components that receive the content. Authentication may be related to a particular content protection scheme such as CSS, CPPM, or CPRM.

At block 525, a decrypting component performs a key exchange that allow for decryption of encrypted content. The key exchange may be based on encryption protocols related to CSS, CPPM, or CPRM.

At block 530, decrypted content is passed on to succeeding components, until it is made available to an output source such as a video or audio output.

Exemplary Computer (Multimedia Device) Environment

The subject matter is described in the general context of computer-executable instructions, such as program modules, being executed by a rendering device or personal computer 214 of FIG. 2. Generally, program modules include routines, programs, objects, components, data structures, etc. that perform particular tasks or implement particular abstract data types. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 6:
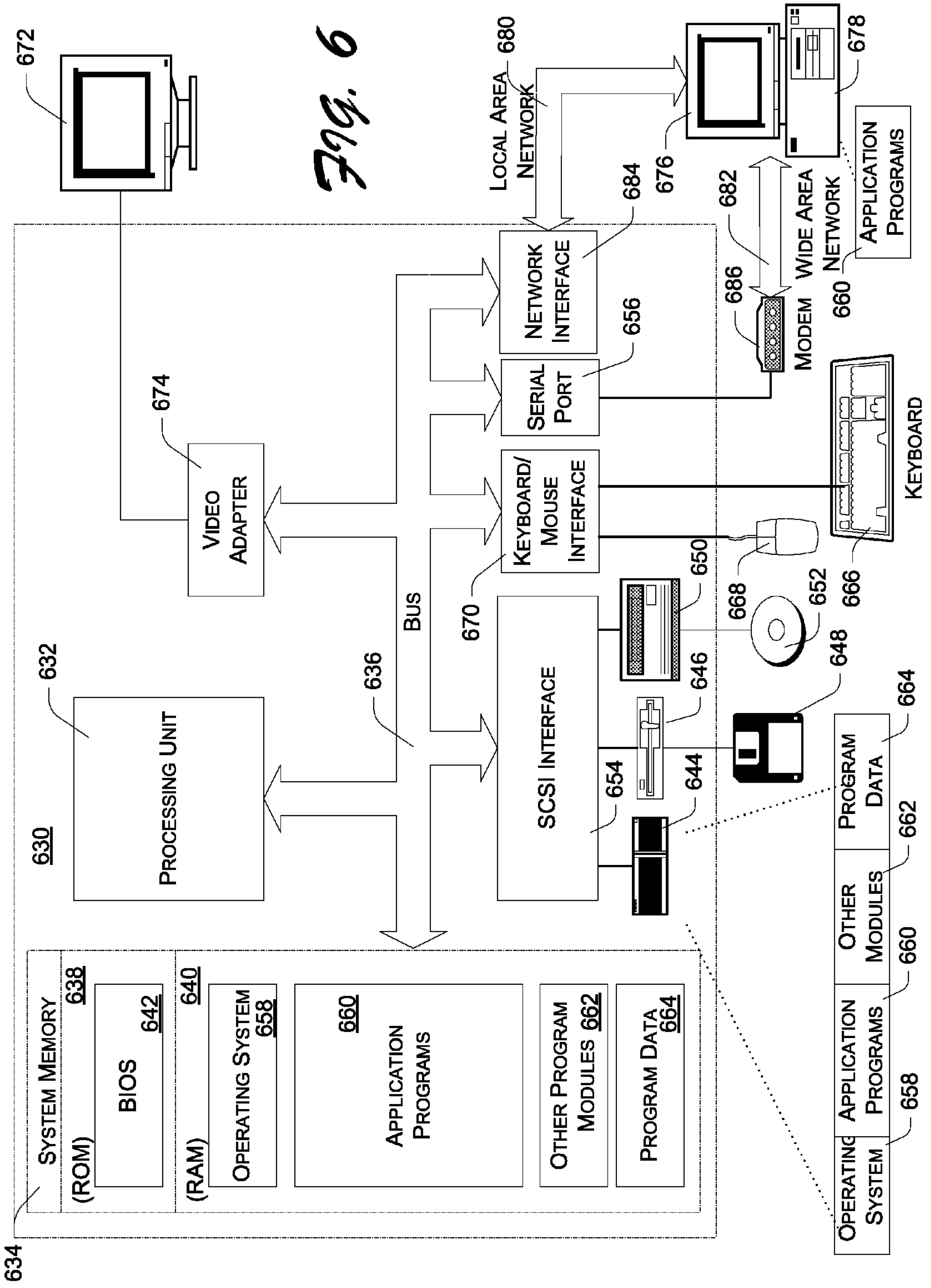
FIG. 6 is a block diagram illustrating a general example of a computer that is used in accordance with the subject matter.

FIG. 6 shows a general example of a computer 630 that is used in accordance with the subject matter. Computer 630 is shown as an example of a computer that can perform the functions of a multimedia device. Computer 630 includes one or more processors or processing units 632, a system memory 634, and a bus 636 that couples various system components including the system memory 634 to processors 632.

The bus 636 represents one or more of any of several types of bus structures, including a memory bus or memory controller, a peripheral bus, an accelerated graphics port, and a processor or local bus using any of a variety of bus architectures. The system memory includes read only memory (ROM) 638 and random access memory (RAM) 640. A basic input/output system (BIOS) 642, containing the basic routines that help to transfer information between elements within computer 630, such as during start-up, is stored in ROM 638. Computer 630 further includes a hard disk drive 644 for reading from and writing to a hard disk, not shown, a magnetic disk drive 646 for reading from and writing to a removable magnetic disk 648, and an optical disk drive 650 for reading from or writing to a removable optical disk 652 such as a CD ROM or other optical media. The hard disk drive 644, magnetic disk drive 646, and optical disk drive 650 are connected to the bus 636 by an SCSI interface 654 or some other appropriate interface. The drives and their associated computer-readable media provide nonvolatile storage of computer readable instructions, data structures, program modules and other data for computer 630.

Although the exemplary environment described herein employs a hard disk, a removable magnetic disk 648 and a removable optical disk 652, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 648, optical disk 652, ROM 638, or RAM 640, including an operating system 658, one or more application programs 660, other program modules 662, and program data 664.

A user may enter commands and information into computer 630 through input devices such as keyboard 666 and pointing device 668. Other input devices (not shown) may include a microphone, joystick, game pad, satellite dish, scanner, or the like. These and other input devices are connected to the processing unit 632 through interface 670 that is coupled to bus 636. Monitor 672 or other type of display device is also connected to bus 636 via an interface, such as video adapter 674.

Computer 630 operates in a networked environment using logical connections to one or more remote computers, such as a remote computer 676. The remote computer 676 may be another personal computer, a server, a router, a network PC, a peer device or other common network node, and typically includes many or all of the elements described above relative to computer 630, although only a memory storage device 678 has been illustrated in FIG. 6. The logical connections depicted in FIG. 6 include a local area network (LAN) 680 and a wide area network (WAN) 682. Such networking environments are commonplace in offices, enterprise-wide computer networks, intranets, and the Internet.

When used in a LAN networking environment, computer 630 is connected to the local network 680 through a network interface or adapter 684. When used in a WAN networking environment, computer 630 typically includes a modem 686 or other means for establishing communications over the wide area network 682, such as the Internet. The modem 686, which may be internal or external, is connected to the bus 636 via a serial port interface 656. In a networked environment, program modules depicted relative to the personal computer 630, or portions thereof, may be stored in the remote memory storage device. It will be appreciated that the network connections shown are exemplary and other means of establishing a communications link between the computers may be used.

Generally, the data processors of computer 630 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory.

The subject matter described herein includes these and other various types of computer-readable storage media when such media contain instructions or programs for implementing the steps described below in reference to FIG. 6 in conjunction with a microprocessor or other data processor.

The subject matter also includes the computer itself when programmed according to the methods and techniques described below. Furthermore, certain sub-components of the computer may be programmed to perform the functions and steps described below. The subject matter includes such sub-components when they are programmed as described. In addition, the subject matter described herein includes data structures, described below, as embodied on various types of memory media.

For purposes of illustration, data, programs and other executable program components, such as the operating system are illustrated herein as discrete blocks, although it is recognized that such programs and components reside at various times in different storage components of the computer, and are executed by the data processor(s) of the computer.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method of processing encrypted multimedia content through an multimedia processing stack, wherein the multimedia processing stack comprises one or more ordered and successively arranged processing components, the method comprising:

providing the multimedia content at each successive processing component and passing the multimedia content to a successive processing component;

optionally processing the multimedia content at each processing component;

receiving one or more decryption commands or key exchange commands associated with the multimedia content at one of the processing components, wherein the commands are based on of the following content protection schemes content-scrambling system (CSS), content protection for prerecorded media (CPPM), and content protection for recorded media (CPRM);

relaying the decryption commands or key exchange commands to one or more successive processing components to a decrypting one of the processing components that is capable of decrypting the multimedia content; and decrypting the multimedia content at the decrypting one of the processing components before passing the multimedia content to the successive processing component.

2. The method of claim 1 wherein the providing is from a DVD disc.

3. The method of claim 1 wherein the providing is from a website.

4. The method of claim 1 wherein the providing, receiving, relaying, and passing comprise streaming encrypted content and keys.

5. The method of claim 1 wherein the receiving, relaying, and passing are performed at an audio processing stack.

6. The method of claim 1 wherein the receiving, relaying, and passing are performed at a video processing stack.

7. The method of claim 1 wherein the receiving, relaying, and passing are performed using common interfaces at the components.

8. The method of claim 7 wherein the common interfaces provide secure logical busses between the components.

9. The method of 1 further comprising authenticating the stack of one or more components prior to the receiving.

10. A personal computer that performs the method of claim 1.

11. A method performed by a computing device comprising:

relaying decryption commands or key exchange commands through a media processing stack of the computer device, of one or more components having a common protocol with one another, wherein the commands are based on one of the following content protection schemes: content-scrambling system (CSS), content protection for prerecorded media (CPPM), and content protection for recorded media (CPRM);

receiving the decryption commands or key exchange commands at an interface; and passing the decryption commands or key exchange commands to the next component in the media processing stack using the common protocol.

12. The method of claim 11 wherein the common protocol is a common interface provided in the components of the media processing stack used to communicate with one another and other components and applications external to the media processing stack.

13. The method of claim 11 further comprising creating a secure logical bus through the media processing stack through implemented by the common protocol.

14. The method of claim 11 further comprising setting up an encryption session between a decrypting component and a subsequent component in the media processing stack to allow decrypted content to be re-encrypted for use by the subsequent component.

15. The method of claim 14 wherein a decryption key is passed to the decrypting component from the next component in the media processing stack.

16. A personal computer that performs the method of claim 11.

17. A method performed at a computing device comprising:

establishing secure logical busses from a media source through a first media processing stack of components including a driver component of the computing device;

relaying decryption commands or key exchange commands through the first media processing stack of the computer device, wherein the commands are based on one of the following content protection schemes: content-scrambling system (CSS), content protection for prerecorded media (CPPM), and content protection for recorded media (CPRM);

sending data down to the driver component through the secure logical busses; and returning data from the driver component to an interface of an application at the computing device.

18. The method of claim 17 wherein the establishing secure logical busses comprise synchronous serial busses.

19. The method of claim 17 wherein the establishing secure logical busses comprise asynchronous busses that allow commands to be received from different sources.

20. The method of claim 17 wherein the sending comprises a verb command comprised of a bit word of a set number and the returning comprises a response comprised of a bit word of the set number.

21. The method of claim 17 wherein an index value indicates the beginning of the sending of data, and an index value indicates the ending of sending data.

22. The method of claim 17 wherein the data comprises bytes and includes an index value indicating a relative location of a group comprising the data within a data stream used to communicate keys.

23. The method of claim 22 wherein the data stream is reconstructed by sorting groups by their indices.

24. The method of claim 22 wherein an identifier is included to identify a command stream associated with a content stream.

25. The method of claim 17 further comprising decrypting content at the second media processing stack independent of the first media processing stack.

26. A personal computer that performs the method of claim 17.

27. A method performed at a computing device comprising:

parsing encrypted content from a media source based on media type;

passing the parsed encrypted content along a media processing stack of components of the computing device, to a decrypting component that decrypts the parsed encrypted content;

establishing logical busses from the media source through the stack of components to the decrypting component; and relaying decryption commands or key exchange commands through the media processing, wherein the commands are based on one of the following content protection schemes: content-scrambling system (CSS), content protection for prerecorded media (CPPM), and content protection for recorded media (CPRM).

28. The method of claim 27 wherein the parsing is performed by a navigation component coupled to an application program.

29. The method of claim 27 wherein the passing is performed through an audio processing stack.

30. The method of claim 27 wherein the passing is performed through a video processing stack.

31. The method of claim 27 wherein the parsing, passing, and relaying comprise streaming encrypted content and keys.

32. A personal computer that performs the method of claim 27.

33. A multimedia processing device comprising:

a decoder configured to receive and decompress or process encrypted content from a media source and relay decompressed or processed encrypted content;

an audio renderer to render decompressed encrypted and decrypted content and relay decompressed rendered encrypted content if not able to decrypt the decompressed encrypted content;

an interface to receive decompressed rendered encrypted and decrypted content and relay decompressed rendered encrypted content if not able to decrypt the decompressed rendered encrypted content; and an audio driver to receive decompressed rendered encrypted and decrypted content and to decrypt decompressed rendered encrypted content, and generate audio output, wherein audio renderer, the interface, and the audio driver are further configured to receive commands to decrypt encrypted content and to pass on the commands if not able to decrypt the encrypted content, the commands based on of the following protection schemes: content-scrambling system (CSS), content protection for prerecorded media (CPPM), and content protection for recorded media (CPRM).

34. The multimedia processing device of claim 33 wherein the decoder, the audio renderer, the interface, and the audio driver are further configured to receive keys to decrypt encrypted content and to pass on the keys if not able to decrypt the encrypted content.

35. The multimedia processing device of claim 33 wherein the decoder, the audio renderer, the interface, and the audio driver share a common property set comprised of properties or common interface for sending and receiving content and keys.

36. The multimedia processing device of claim 33 wherein the decoder is coupled to a navigation component coupled to a DVD drive, wherein the encrypted content is from a DVD disc in the DVD drive.

37. The multimedia processing device of claim 33 wherein the decoder is coupled to a navigation component that receives the encrypted content from a website.

38. The multimedia processing device of claim 33 wherein the driver comprises a set of logical registers.

39. The multimedia processing device of claim 33 wherein the driver receives and sends serial commands.

40. A personal computer that comprises the processing stack of claim 33.

41. A computer comprising:

a processor;

a memory to store instructions executable on the processor configured to pass encrypted content and decryption information including commands, through one or more stacks of components to a decrypting component and an audio driver, wherein the commands are based on one of the following content protection schemes: content-scrambling system (CSS), content protection for prerecorded media (CPPM), and content protection for recorded media (CPRM).

42. The computer of claim 41 wherein the instructions are further configured to send commands from a component in a first stack of components that affect a component in a second stack of components.

43. The computer of claim 41 wherein the component in the first stack that sends instructions is an audio driver, and the second stack of components is a video processing stack.

44. The computer of claim 41, wherein the commands are passed on by components to other components in the first stack of components.

45. The computer of claim 41, wherein the audio driver comprises a set of registers configured to store the instructions.

46. The computer of claim 41, wherein the audio driver sends the instructions through a synchronous serial bus.

47. The computer of claim 41, wherein the audio driver sends the instructions through an asynchronous bus.

48. The computer of claim 41 wherein the encrypted content and decryption information are from a media source.

49. The computer of claim 41 wherein the encrypted content and decryption information are from a DVD disc.

50. The computer of claim 41 wherein the encrypted content and decryption information are from a website.

51. The computer of claim 41 further comprising creating a secure logical busses in which the encrypted content and decryption information are sent.

* * * * *